(12) United States Patent
West

(10) Patent No.: US 7,435,955 B2
(45) Date of Patent: Oct. 14, 2008

(54) SCANNING PROBE MICROSCOPE CONTROL SYSTEM

(76) Inventor: Paul E. West, 17981 Sky Park Cir., Suite J, Irvine, CA (US) 92614

( * ) Notice: Subject to any disclaimer, the term of this patent is extended or adjusted under 35 U.S.C. 154(b) by 171 days.

(21) Appl. No.: 11/193,141

(22) Filed: Jul. 29, 2005

(65) Prior Publication Data

US 2007/0023649 A1 Feb. 1, 2007

(51) Int. Cl.
*G01N 23/00* (2006.01)
(52) U.S. Cl. .................. 250/307; 250/306; 977/850
(58) Field of Classification Search ...... 250/306–443.1; 977/850
See application file for complete search history.

(56) References Cited

U.S. PATENT DOCUMENTS

| | | | | |
|---|---|---|---|---|
| 4,924,091 A | * | 5/1990 | Hansma et al. | 250/306 |
| 5,229,606 A | * | 7/1993 | Elings et al. | 250/306 |
| 5,253,516 A | * | 10/1993 | Elings et al. | 73/105 |
| 5,266,801 A | * | 11/1993 | Elings et al. | 250/306 |
| RE34,708 E | * | 8/1994 | Hansma et al. | 250/306 |
| 5,336,887 A | * | 8/1994 | Yagi et al. | 250/306 |
| 5,415,027 A | * | 5/1995 | Elings et al. | 73/105 |
| 5,575,660 A | * | 11/1996 | Hooks | 434/374 |
| 5,652,428 A | * | 7/1997 | Nishioka et al. | 250/307 |
| 5,672,816 A | * | 9/1997 | Park et al. | 73/105 |
| 5,898,176 A | * | 4/1999 | Mori et al. | 250/307 |
| 6,255,127 B1 | * | 7/2001 | Fujino et al. | 438/16 |
| RE37,560 E | * | 2/2002 | Elings | 310/316.01 |
| 6,781,125 B2 | * | 8/2004 | Tokuda et al. | 250/310 |
| 6,881,954 B1 | * | 4/2005 | Morimoto et al. | 250/306 |
| 6,912,893 B2 | * | 7/2005 | Minne et al. | 73/105 |
| 6,927,391 B2 | * | 8/2005 | Tokuda et al. | 250/310 |
| 7,041,963 B2 | * | 5/2006 | El Rifai et al. | 250/234 |
| 2002/0050565 A1 | * | 5/2002 | Tokuda et al. | 250/310 |
| 2005/0001164 A1 | * | 1/2005 | Tokuda et al. | 250/309 |
| 2005/0199828 A1 | * | 9/2005 | Tokuda et al. | 250/492.3 |
| 2008/0017809 A1 | * | 1/2008 | Hattori et al. | 250/442.11 |

* cited by examiner

*Primary Examiner*—Jack I. Berman
*Assistant Examiner*—Andrew Smyth
(74) *Attorney, Agent, or Firm*—Russo & Hale LLP; William C. Milks, III

(57) ABSTRACT

A system for controlling the operation of a scanning probe microscope that greatly simplifies the microscope's operation is disclosed. The software design incorporates several advanced features such as a sample designator file, video tutorials, automation algorithms, and the ability to remotely load sample designator files and video tutorials.

20 Claims, 3 Drawing Sheets

Zoom Window – appears if designated in sample designator file

SCANNING PROBE MICROSCOPE CONTROL SYSTEM

BACKGROUND OF THE INVENTION

1. Field of the Invention

The present invention relates generally to scanning probe microscopy and, more particularly, to the system comprising control software that is used for operating the SPM. In accordance with one embodiment of the present invention, control software is disclosed that automates many of the steps required for obtaining a scanning probe microscopy image, thus substantially reducing the level of expertise required to operate a scanning probe microscope (SPM).

2. Description of the Prior Art

In an SPM, a sharp probe is scanned over a surface of a sample in a raster scan motion while the probe is maintained in a predetermined relationship to the surface. A sensing system, together with a feedback circuit and electromechanical transducer, is used to maintain the predetermined relationship between the probe and surface. A three-dimensional image of the surface may then be created by displaying the motion of the probe on a display such as a computer screen. FIG. 1 illustrates the primary components of a scanning probe microscope stage and control system.

The most commonly used type of SPM is the atomic force microscope (AFM). In an AFM, the relationship between the probe and surface of the sample is established using a force sensor comprising the sensing system. The probe is raster scanned in the XY plane, and the Z position of the probe is controlled by the sensing system together with a feedback circuit and an electromechanical transducer. The force sensor in an AFM can be a light lever design, or may be a quartz crystal sensor.

The stages of an SPM typically include a series of coarse translation mechanisms for moving the sample large distances, several millimeters, along the X, Y, and Z axes. Fine translation devices, typically piezoelectric elements, are also included for moving the probe along the X, Y, and Z axes during the imaging operation. Additionally, the SPM includes an optical microscope to facilitate locating features for scanning and for assisting in the motion of the probe as it is moved towards a sample's surface.

Practical operation of an SPM requires the control of all of the stage functions. The parameters that must be controlled include:

x raster—Size, Rate, Frequency
y raster—Size, Rate, Frequency
z feedback—Setpoint, PID parameters, bandwidth
Z Motion Control—Rate, Resolution
XY Motion Control—Rate, Resolution
Video Optic—Zoom, Focus The first SPM, such as the scanning tunneling microscope (STM), used analog electronics to control all of the microscope functions. The human interface to the microscope was a series of knobs and buttons. Although this first approach was functional, it required an expert with an in-depth understanding of the microscope's design to operate.

With the advent of tabletop, affordable, personal computers, the control of scanning probe microscopes was converted to computer control. In such systems, a computer interface electronic unit comprised of analog-to-digital converters, digital-to-analog converters, and TTL logic were used in conjunction with "control software" for the microscope's control, as shown in FIG. 2.

The "control software" is used for controlling all of the scanning and stage functions described above. Initially, the "control software" simply replaced the analog control of the SPM. Over the past five to ten years, two software designs were created for SPM control.

In the first design, the control parameters can be accessed through a series of display screens. At any point, one of the display screens can be opened and a parameter changed. This type of control software is very powerful, but requires the operator to have a detailed knowledge of the microscope's operation.

In the second design, a menu is used that presents the steps required for obtaining a topographic image. FIG. 3 shows an example of this software design. This approach simplifies the operation of the SPM; however, it still requires the operator to have a substantial understanding of the microscope's operation to successfully measure topographic images.

SUMMARY OF THE INVENTION

It is the general object of this invention to provide SPM control software that greatly simplifies the operation of the microscope.

One embodiment of the present invention comprises control software with the following attributes:

A sample designator file is used for establishing the scan parameters and the best positioning for stage automation functions such as a video microscope. Also, the sample designator file establishes the features in the display screens.

For operating steps that require detailed interaction with the microscope stage, a video screen displays the procedure.

Key operations that traditionally require operator input are automated with software algorithms.

Sample designator files as well as supporting videos for the software may be downloaded using the world wide web (www) or a modem.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing.

DETAILED DESCRIPTION OF THE PREFERRED EMBODIMENTS

Figure 1:
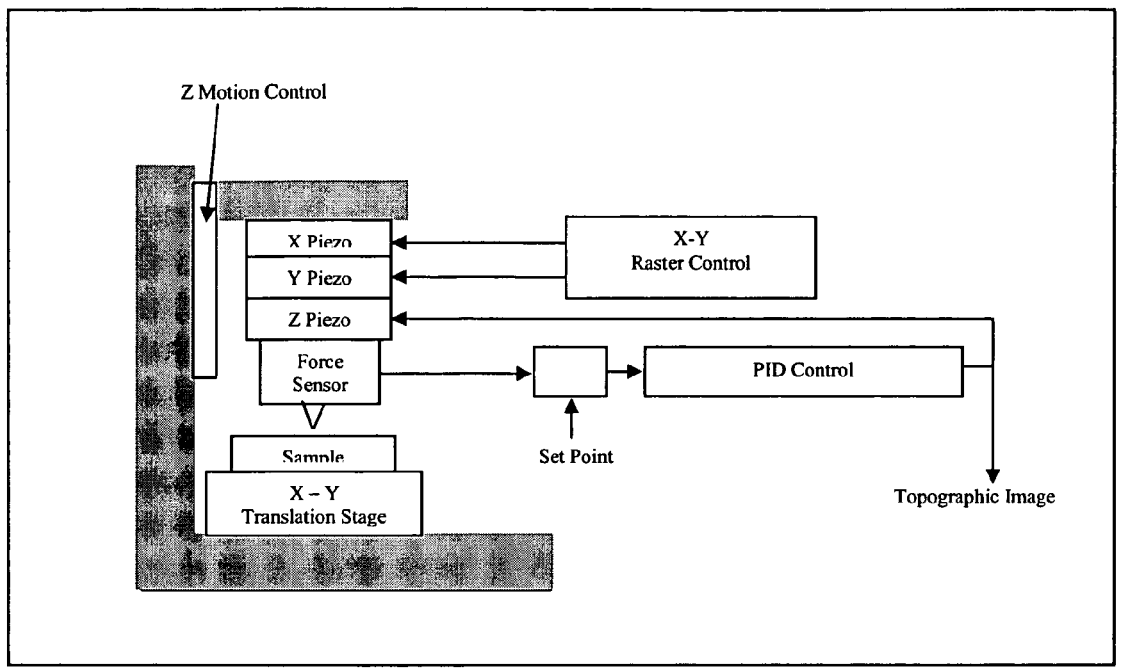
FIG. 1 is a block diagram of a conventional scanning probe microscope stage and control system.
Figure 2:
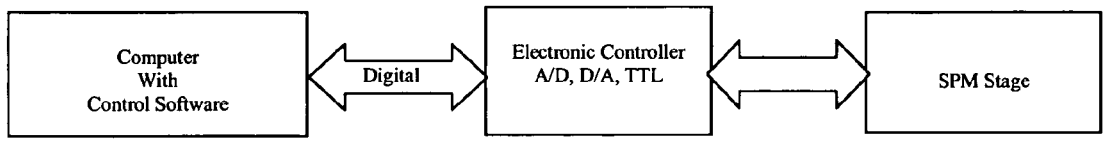
FIG. 2 is a block diagram of a conventional computerized scanning probe microscope control system.
Figure 3:
FIG. 3 illustrates a conventional menu used in a computerized scanning probe microscope control system to present the steps required for obtaining a topographic image.
Figure 4:
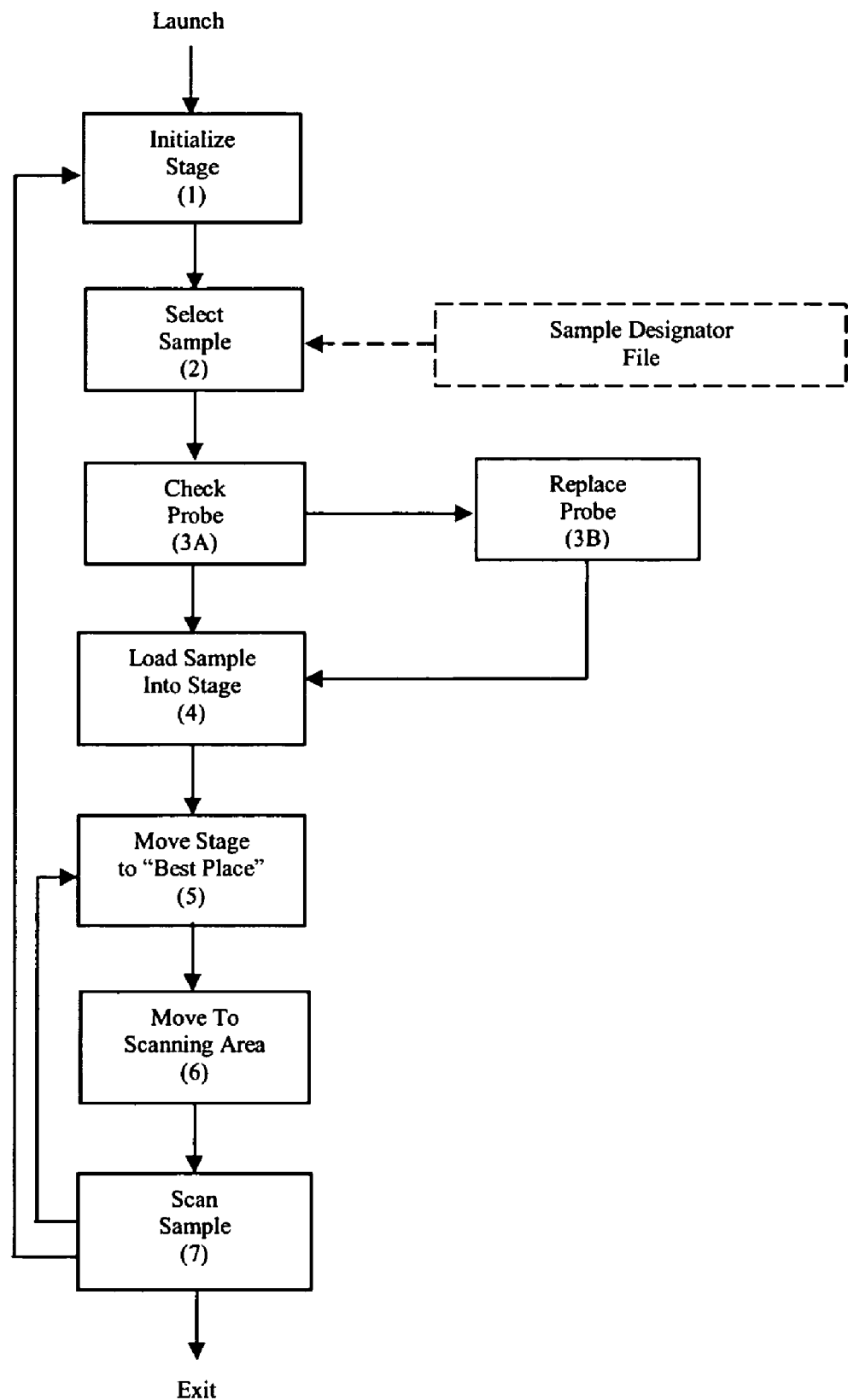
FIG. 4 is a flow diagram in accordance with a preferred embodiment of the present invention for controlling a scanning probe microscope.

A preferred embodiment for controlling a scanning probe microscope (SPM) in accordance with the present invention is shown in the flow diagram illustrated in FIG. 4. After the software comprising the system is launched, seven steps are needed to scan a sample to provide an image such as a topographic image. After the seven steps are completed, there are three options: another region of a sample may be scanned, another sample may be scanned, or the program may be exited. The steps will now be described with reference to FIG. 4.

Step 1: Initialize Stage: When the stage is initialized, all of the motors are moved to their starting positions. For example, the Z motor(s) move the scan head away from the sample holder, and the XY motor(s) move the sample holder to the front position, in preparation for adding a sample.

Figure 5:
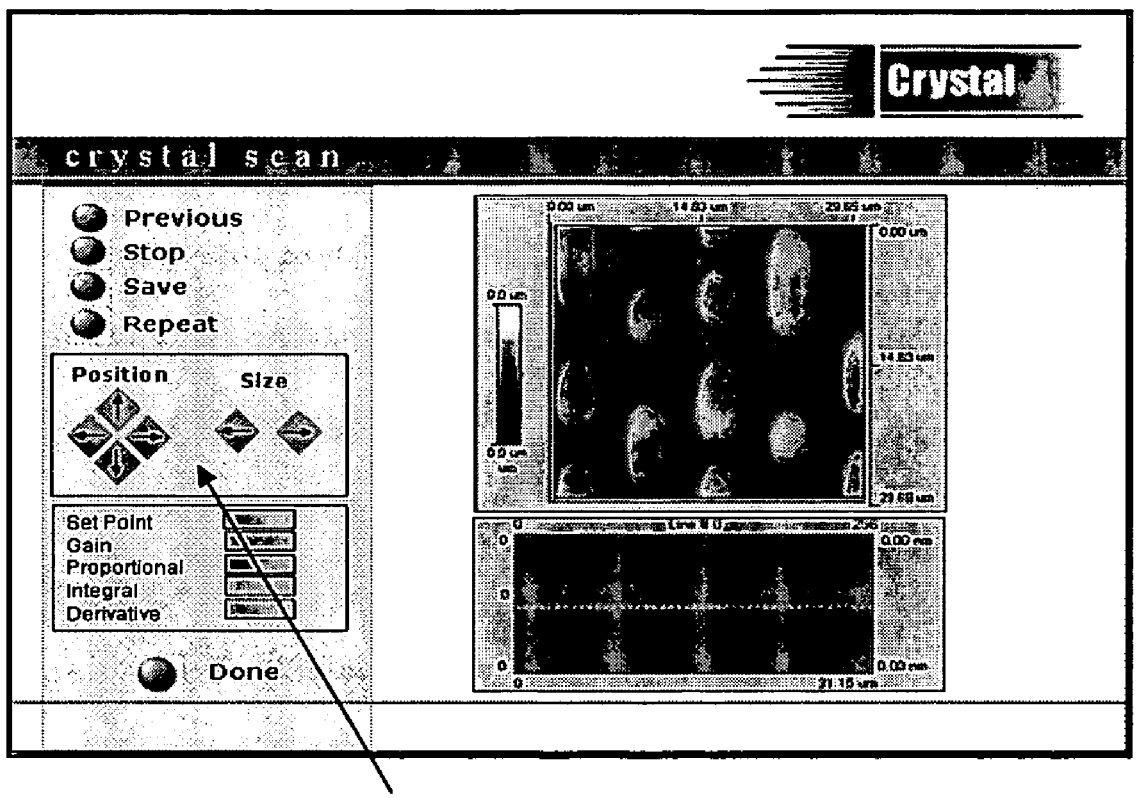
FIG. 5 illustrates predetermined types of samples that may be scanned with a scanning probe microscope.

Step 2: Select Sample: The predetermined types of samples that may be scanned with the SPM are displayed, as shown in FIG. 5. An operator selects the sample type for scanning, and the information from the sample designator file is loaded into the program.

Step 3A: Check Probe: A process is preferably followed that allows establishing the condition of the probe. As an example, a frequency sweep of the probe will determine if the probe is in good enough condition for scanning.

Step 3B: Replace Probe: The probe must be replaced by the operator if the condition is poor. A video may be used to show the exact procedure for removing the old probe and installing a new probe into the SPM.

Step 4: Load Sample: The operator loads a sample onto the stage. A video may be used to show the exact process for loading a sample.

Step 5: Best Position: The X, Y, and Z stage motors are activated to move the stage into the "best position." The "best position" allows rapid focusing of the video microscope. The probe is placed within a small distance, <1 mm, from the sample's surface. The sample thickness, loaded into the sample designator file, is used for setting the height of the video microscope and Z motor.

Step 6: Move Stage: The operator uses icons on the computer screen and the video microscope to move the stage to the region of the sample that will be scanned.

Step 7: Scan Image: The probe approach to the sample's surface is completed and the scanning is started. The scan image window may have many options that appear depending on the information in the sample designator file. For example, if the sample requires higher resolution imaging, an SPM zoom window may appear, as shown in FIG. 5. An option for saving the image is presented with a button in this window.

Software algorithms may be used for automating several of the steps in this sequence.

For example, the probe quality may be established by measuring the Q of the probe/sensor. In Step 7, an algorithm may used to optimize the probe approach to the sample's surface. Further, an algorithm can be used to optimize the set point parameters and the PID control parameters when sample scanning is initiated.

While the foregoing description has been with reference to particular embodiments of the present invention, it will be appreciated by those skilled in the art that changes in these embodiments may be made without departing from the principles and spirit of the invention, the scope of which is defined by the appended claims.

What is claimed is:

1. A method for controlling a scanning probe microscope for imaging the surface of a sample, comprising:
    initializing a stage comprising the scanning probe microscope;
    displaying a plurality of predetermined types of samples that may be scanned with the scanning probe microscope;
    selecting the sample type for scanning;
    loading information relating to the selected sample type from a sample designator file into a control program;
    loading a sample onto the stage;
    activating X, Y, and Z stage motors to move the stage into the best position;
    moving the stage to a region of the sample that is to be scanned;
    completing the probe approach to the surface of the sample; and
    initiating a scan.

2. The method according to claim 1 wherein the step of initializing the stage comprises the step of moving all of the stage motors to their starting positions.

3. The method according to claim 2 wherein one or more Z motors move a scan head away from a sample holder, and one or more XY motors move the sample holder to a front position, in preparation for adding a sample.

4. The method according to claim 1, further comprising the step of checking a probe of the scanning probe microscope.

5. The method according to claim 4 wherein the step of checking the probe comprises establishing the condition of the probe.

6. The method according to claim 5 wherein establishing the condition of the probe comprises the step of performing a frequency sweep of the probe to determine if the probe is in good enough condition for scanning.

7. The method according to claim 4 further comprising the step of replacing the probe if the condition is poor.

8. The method according to claim 7 further comprising the step of showing a video to illustrate the procedure for removing the probe and installing a new probe into the scanning probe microscope.

9. The method according to claim 1, further comprising the step of showing a video to illustrate the process for loading a sample.

10. The method according to claim 1, wherein the best position allows rapid focusing of a video microscope.

11. The method according to claim 1 wherein the probe is placed within a small distance, <1 mm, from the sample's surface.

12. The method according to claim 1 wherein a sample thickness, stored in the sample designator file, is used for setting the height for the Z motor.

13. The method according to claim 1 wherein a sample thickness, stored in the sample designator file, is used for setting the height of a video microscope.

14. The method according to claim 1 wherein the stage is moved to the region of the sample that is to be scanned using icons on a computer screen and a video microscope.

15. The method according to claim 1, further comprising the step of providing a scan image window to display one or more selections depending on the information in the sample designator file.

16. The method according to claim 15 wherein one selection is a scanning probe microscope zoom window if the sample requires higher resolution imaging.

17. The method according to claim 15 wherein one selection is a button for saving the image.

18. Control software for a scanning probe microscope, the software comprising:
    code for initializing a stage comprising the scanning probe microscope;
    code for displaying a plurality of predetermined types of samples that may be scanned with the scanning probe microscope;
    code for enabling selection of the sample type for scanning;

code for loading information relating to the selected sample type from a sample designator file into a control program;

code for activating X, Y, and Z stage motors to move a stage, onto which a sample is loaded, into the best position;

code for controlling movement of the stage to a region of the sample that is to be scanned;

code for completing the probe approach to the surface of the sample; and code for initiating a scan.

19. A scanning probe microscope having control software, the software comprising:

code for initializing a stage comprising the scanning probe microscope;

code for displaying a plurality of predetermined types of samples that may be scanned with the scanning probe microscope;

code for enabling selection of the sample type for scanning;

code for loading information relating to the selected sample type from a sample designator file into a control program;

code for activating X, Y, and Z stage motors to move a stage, onto which a sample is loaded, into the best position;

code for controlling movement of the stage to a region of the sample that is to be scanned;

code for completing the probe approach to the surface of the sample; and code for initiating a scan.

20. The software of claim 19 wherein a sample designator file is downloaded using the world wide web (www) or a modem.

* * * * *